(12) United States Patent
Williams et al.

(10) Patent No.: US 6,175,363 B1
(45) Date of Patent: Jan. 16, 2001

(54) METHOD AND SYSTEM TO PROVIDE FUNCTIONALITY ACCESS BASED ON USER APPROACH TO NETWORK AND SYSTEM MANAGEMENT TASKS

(75) Inventors: Evelyn L. Williams, Longmont; Lawrence M. Besaw; Robert Raymond, both of Fort Collins, all of CO (US); Alfred Hermann, Weil der Stadt (DE)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/086,635

(22) Filed: May 29, 1998

(51) Int. Cl.[7] ........................................................ G06F 3/14
(52) U.S. Cl. .......................... 345/334; 345/331; 345/348; 345/335; 345/354; 345/969; 345/356; 709/223; 709/234
(58) Field of Search ..................................... 345/348, 350, 345/354, 331, 335, 969, 356, 357, 352; 709/223, 224

(56) References Cited

U.S. PATENT DOCUMENTS

| | | | |
|---|---|---|---|
| 5,625,783 | * 4/1997 | Ezekiel et al. | 345/352 |
| 5,644,739 | * 7/1997 | Moursund | 395/354 |
| 5,675,782 | * 10/1997 | Montague et al. | 713/201 |
| 5,801,702 | * 9/1998 | Dolan et al. | 345/357 |
| 5,825,355 | * 10/1998 | Palmer et al. | 345/336 |
| 5,958,012 | * 9/1999 | Battat et al. | 709/224 |
| 5,958,016 | * 9/1999 | Chang et al. | 709/229 |
| 6,009,466 | * 12/1999 | Axberg et al. | 345/348 |
| 6,014,138 | * 1/2000 | Cain et al. | 345/335 |

* cited by examiner

Primary Examiner—Raymond J. Bayerl
Assistant Examiner—Thomas T. Nguyen

(57) ABSTRACT

The user interface of a window in a windows-based computer environment, such as an application window (50) or a launcher window (10), has controls that provide a user with an explicit mechanism for changing the user interface approach taken by the user interface in presenting functionality of network and systems management applications to the user via the user interface. The following types of user interface approaches can be obtained in network and systems management applications: an object-based approach, is a task-based approach, an information-based approach, and a tool-based approach. A change in the user interface approach via an approach control mechanism (14) is typically associated with a corresponding change in the items presented to the user and the way in which functionality will be used.

37 Claims, 4 Drawing Sheets

METHOD AND SYSTEM TO PROVIDE
FUNCTIONALITY ACCESS BASED ON USER
APPROACH TO NETWORK AND SYSTEM
MANAGEMENT TASKS

CROSS REFERENCES TO RELATED APPLICATIONS

The subject matter of the present application is related to copending U.S. application, Ser. No. 09/087,066, titled "A User Interface Mechanism for Manipulating Context in Computer Management Applications", Docket No. 10980424-1, filed May 29, 1998, and copending U.S. application, Ser. No. 09/087583, titled "A User Interface Mechanism for Maintaining Quick Access to Important Information in a Windows-Based Computer Environment", Docket No. 10980426-1, filed May 29, 1998, both of which are assigned to the assignee hereof and are herein incorporated by reference.

FIELD OF THE INVENTION

The present invention relates generally to windows-based computer applications, and more particularly to a user interface mechanism that provides functionality access to a user based on the user interface approach that is taken in computer applications, such as network and systems management applications.

BACKGROUND OF THE INVENTION

Many computer environments employ windows having graphical user interface (GUI) capabilities that aid the user in interacting with various applications in a straight-forward and intuitive manner. Most of these applications use an object-action paradigm in which the user seeks the object they want to act on. Once the object is located and selected, the user selects the action that they want to take on the object. Because of the importance of ergonomic data in task orientation, applications have started to take a task oriented approach in which the application guides the user through the actions that they need to take via a wizard or a properties box of the GUI.

Generally, applications take a single approach to presenting their functionality to the user and the user has no means of taking a different approach based on user preferences, the constraints of the objective the user is trying to accomplish or the way the user is thinking of the current problem or objective. Users must therefore make their choice in the approach to functionality presentation when they buy applications that take different functionality approaches to a greater or lesser extent.

A disadvantage of the single approach to functionality presentation is that the approach may not match the user's needs in all situations. In addition, when accessing a suite of applications, this will cause the user to context switch according to the approach of the particular application. Users are forced to learn to access the functionality in the way that the application developed it. This places an extra burden on the user and can interfere with the user's productivity and can result in user errors. Assume, for example, that a user's objective is to find out whether a backup from the previous evening of a computer system named "PC1" was successful or if there were errors in the backup. The user could be thinking of this objective from a variety of different approaches: object-oriented, task-oriented, tool-oriented, or information-oriented. In the object-oriented approach, the user would wish to locate the computer PC1 and after locating it, would request information concerning the most recent backup of PC1. In the task-oriented approach, the user would want to look for the task of reviewing backup session information. In the tool-oriented approach, the user would wish to locate the tool that performed the backup, e.g., HP OpenView OmniBack, and then have that tool inform the user of the success of the backup session. In an information-oriented approach, the user would want to access a report on the success of the recent backup sessions. If the user was able to go to a single location and choose the approach to functionality presentation that matched the user's preferred approach to a task, they would not need to spend time reformulating their objectives in a way the matches the approach taken by the application.

There is therefore an unmet need in the art for a user to be able to access functionality based on the user's preferred approach to doing their work. Allowing the user to be able to choose how to access the desired functionality for a given task from a single location would greatly reduce the amount of errors made by the user and would also enhance the user's productivity.

SUMMARY OF THE INVENTION

It is therefore an object of the present invention for a user of a windows-based user interface to be able to access functionality based upon the user's preferred approach to tasks.

Therefore, according to the present invention, a method and system for allowing a user to change the way in which functionality in a windows-based computer environment is presented to the user is disclosed. The user interface of the window is characterized as having one or more approach controls, such as tabs in a scoping pane, e.g. functionality pane, of the user interface, and one or more functionality controls, such as information contained in folders of the scoping pane, through which the user can access functionality that corresponds to the type of user interface approach selected by the user. The user selects the user interface approach by manipulation of an approach control of the one or more approach controls. Once the user interface approach is selected by the user, desired functionality of that user interface approach can be accessed by selection of one or more functionality controls. The user interface approach and/or the functionality of a given user interface approach selected by the user can be easily and readily changed in the window by appropriate manipulation of the approach controls and/or functionality controls of the user interface. The present invention is applicable to both application and launcher windows, as well as to object-based approaches, task-based approaches, information-based approaches, and tool-based approaches. The methodology of the present invention may be implemented in a computer program of a computer-readable medium.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

According to the present invention, the user interface of a window, such as an application window or a launcher window, has controls that provide the user with an explicit mechanism for changing the user interface approach taken for presenting functionality to the user via the user interface. The user interface approach may be a user-guided approach with an object-action paradigm or an application-guided approach with a task orientation. A change in approach via an approach control mechanism is typically associated with a change in the items presented to the user and the way in which functionality will be used. Examples of types of approaches to functionality include the task-based approach in which the computer environment assists the user complete a list of tasks, the object-based approach in which the computer environment assists the user to manipulate objects such as documents, the information-based approach in which the computer environment presents requested information to the user, and the tools-based approach in which the computer environment provides the user with the tools necessary to accomplish certain things.

Figure 1B:
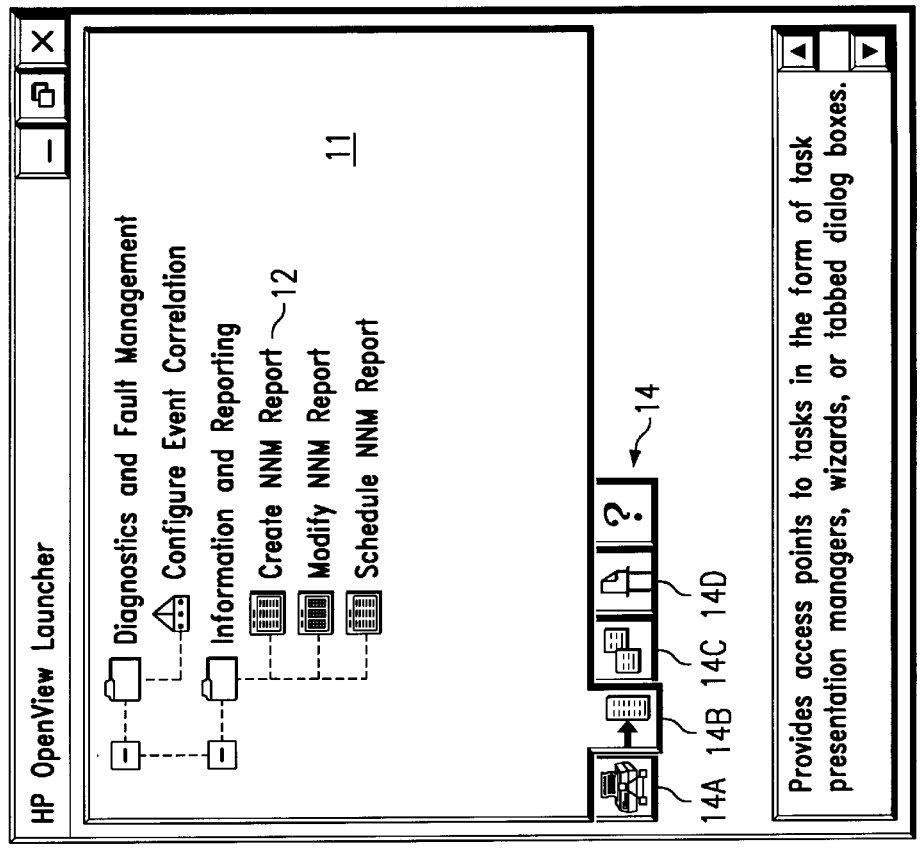
FIGS. 1A, 1B, 1C, and 1D illustrate the use of tabs in an application launcher to provide user access to different approaches to accomplishing the same objectives.
Figure 1A:
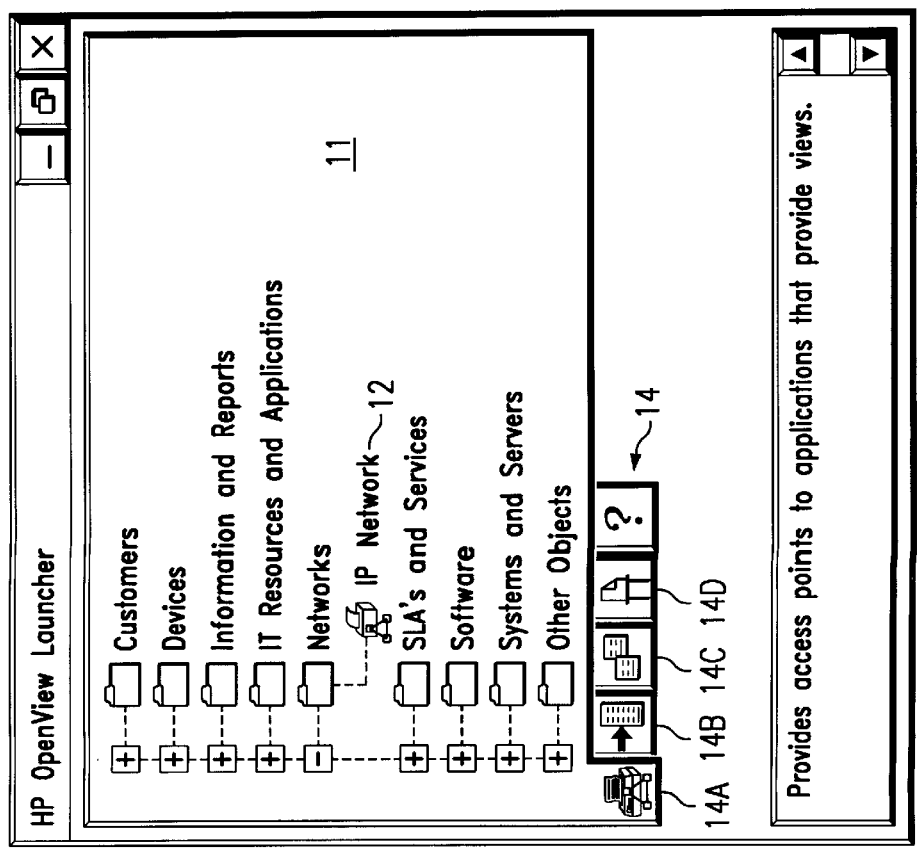
Figure 1C:
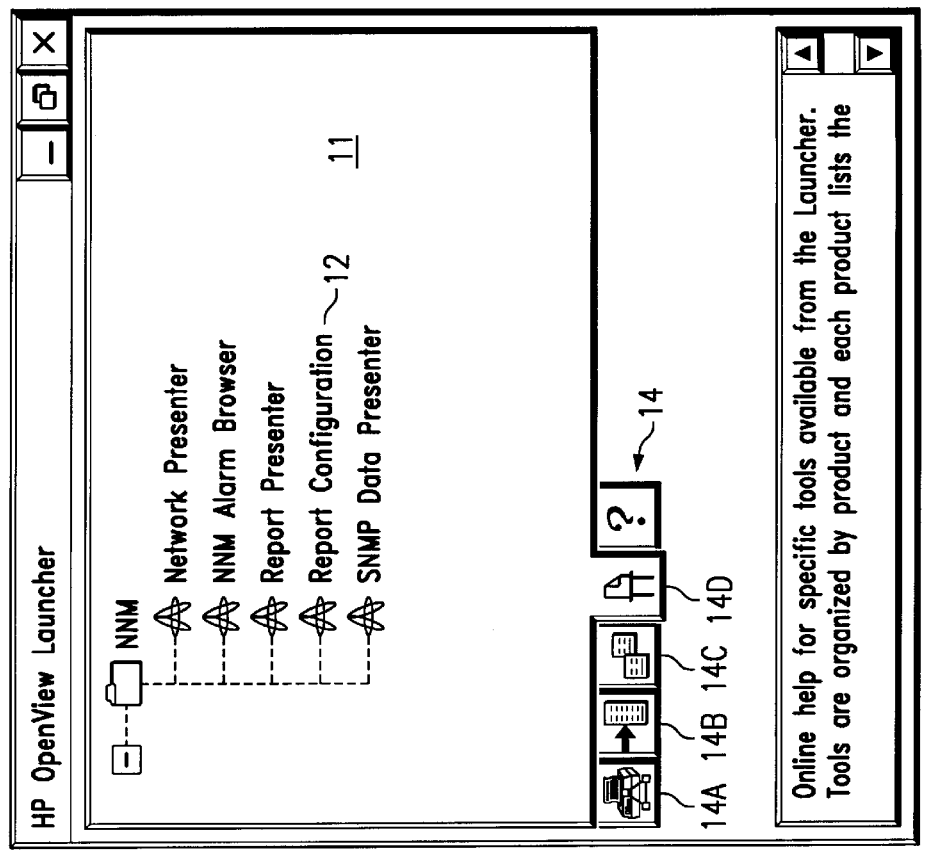
Figure 1D:
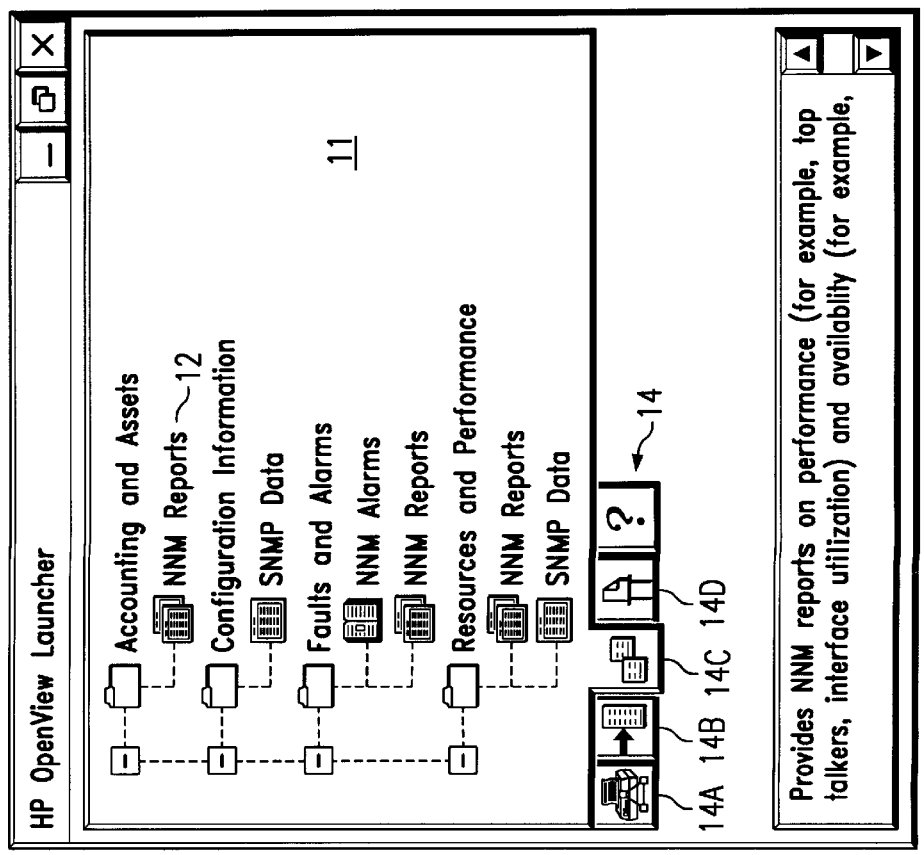

Consider, for example, a centralized launcher for a set of inter-related applications that is used by an information technology (IT) department for accomplishing system, network and service management tasks. The use of controls for manipulating the approach to accomplishing objectives is illustrated in FIGS. 1A through 1D. Referring to FIG. 1A, the available choices for functionality controls 12 and approach controls 14 are shown in the scoping pane 11. The active approach control 14A, the "Object" tab representative of an object-oriented approach, is highlighted with the same background color as the color of the scoping pane. Users can expand the folders in the scoping pane and locate the leaf level items 12 of scoping pane 11 so as to access the functionality for accomplishing their objective. For instance, if the user's objective is to view their IP network they would select an item 12 associated with the object with which they wish to interact. Folders can be nested, such that multiple hierarchical levels are presented.

If a user who is thinking in terms of a task-oriented approach has as an objective to modify the accounting and assets report produced by network management, the user would select the "Task" tab 14B from the set of approach tabs 14 in FIG. 1A. This selection would result in the presentation of user interface 20 as shown in FIG. 1B. Notice that the active tab is now a "Task" tab. The scoping pane 11 shows the set of available folders and tasks. The user would then select the "Modify NNM Report" task 12. This would result in the presentation of a window that would allow the user to modify NNM reports.

Alternatively, if the user is thinking in terms of a report orientation while having the same objective of modifying the NNM reports related to accounting and assets, the user would select the "Information and Report" tab 14C from the set of approach tabs 14 in FIG. 1A. This selection would result in the presentation of user interface 30 in FIG. 1C. This user interface has the active tab 14C set to "Information and Reports" and the scoping pane 11 contains the set of available folders and reports. In this user interface, the user would locate the folder containing the type of report that he or she wanted to modify, i.e., Accounting and Assets. The user would then select the item "NNM Reports," 12. This selection would likewise result in the presentation of the window that would allow the user to modify NNM reports.

Consider a fourth scenario in which the user has the same objective of modifying NNM reports related to accounting and assets, but is thinking in at terms of the tool that is used to generate the report rather than in terms of a task or a report. In this scenario, the user would select the "Tools" tab 14D from the set of approach tabs 14 in FIG. 1A. This selection would result in the presentation of the user interface 40 in FIG. 1D. This user interface has the active tab set to "Tools" and the scoping pane 11 contains the set of available application folders and tools. In this user interface, the user would select the item labeled "Report Configuration" 12. This selection would again result in the presentation of the window that would allow users to modify NNM reports. By allowing alternative approaches to functionality access, the user interface adapts to the way the user is thinking instead of forcing the user to adapt to the user interface.

Figure 2A:
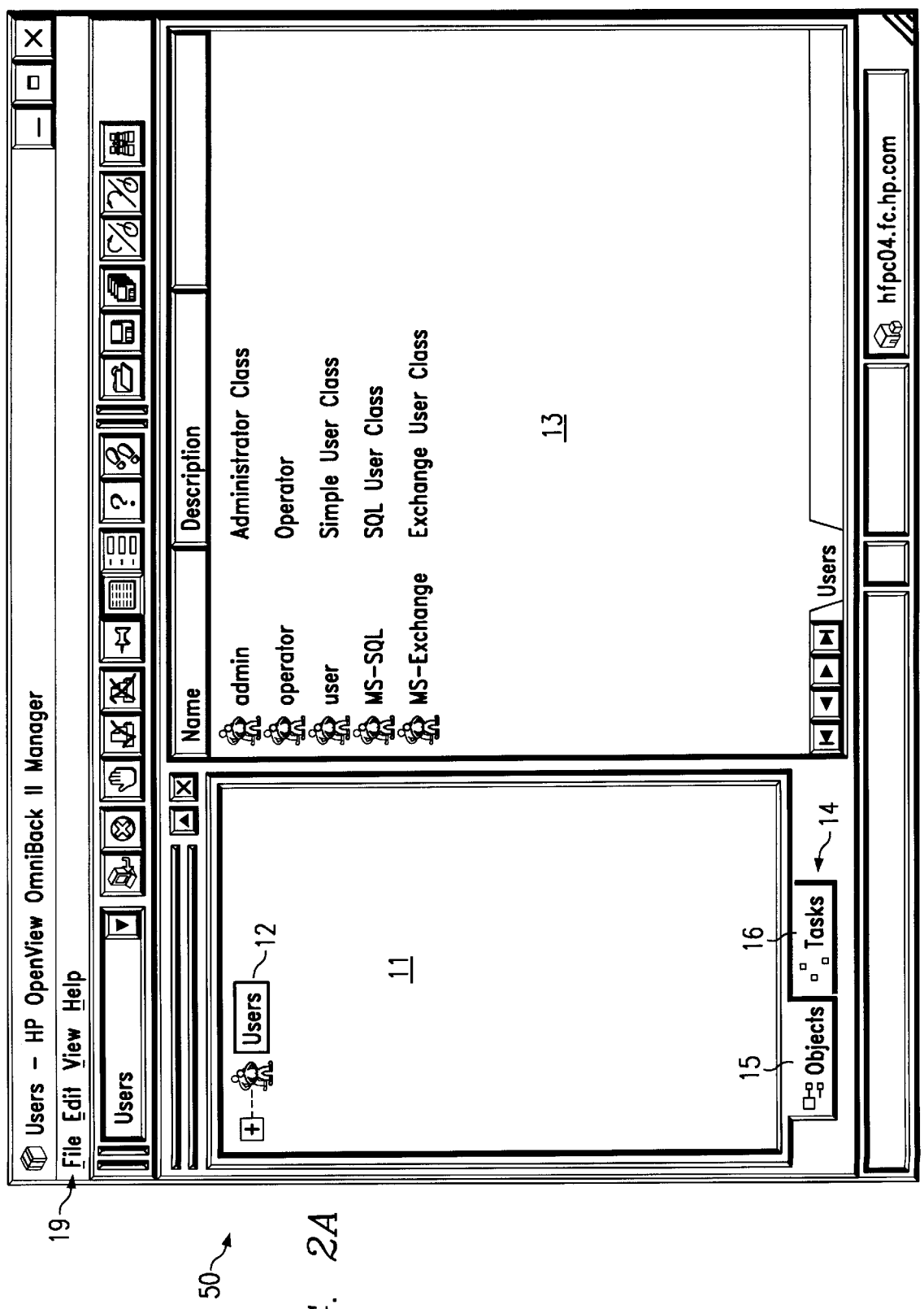
FIGS. 2A and 2B illustrate the use of tabs in an application window to provide user access to different approaches to accomplishing these objectives.
Figure 2B:
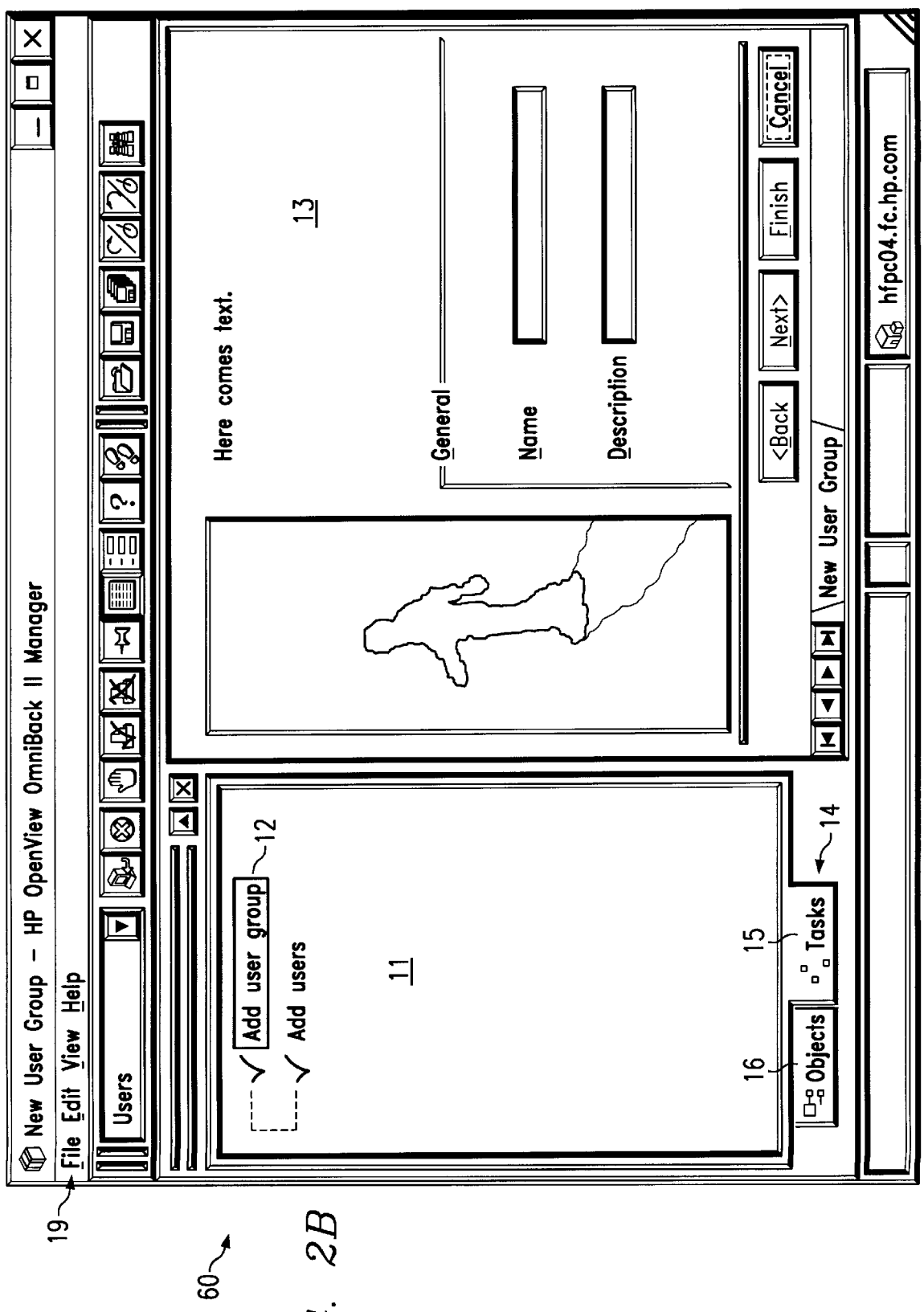

The concept of having the user interface adapt to the user's approach is equally applicable to application windows and centralized application launchers. This is demonstrated in application windows shown in FIGS. 2A and 2B. Consider the scenario in which an application user has the goal of adding a new group to groups of users that will be allowed to backup and restore files in the network and systems environment. Assume that this user is thinking in object-oriented terms and therefore is approaching this objective from the point of view of "User Groups". In FIG. 2A, user interface 50 has a set of approach tabs 14 with the "Object" tab 15 as active tab and tab 16 as the inactive tab. The active tab is indicated by it being the topmost tab shown. Assuming that the application user is thinking in terms of object, i.e., user groups, the user would select "Users" 12 in the scoping pane 11. This would result in the presentation of the existing user groups in the content pane 13. Once the user selected the object, he or she would access the "Add Group" action by selecting it from "Edit" menu 19. This would result in the presentation of a wizard for adding the user group.

If instead the user was thinking in terms of a task approach, i.e., the task of adding groups, the user could change to the task-oriented approach by clicking on the Task tab 16 in FIG. 2A. This would result in the presentation of user interface 60 in FIG. 2B. In the scoping pane 11, the user would select the task that they wanted to accomplish 12. This would result in the presentation in content area 13 of the dialog for adding the user group. Again the user interface matches the way the user is thinking instead of forcing the user to think the way the user interface is implemented.

While the invention has been particularly shown and described with reference to a preferred embodiment, it will be understood by those skilled in the art that various changes in form and detail may be made therein without departing from the spirit and scope of the invention.

What is claimed is:

1. A user interface of a window of a windows-based computer environment that provides means for allowing a user to change the way in which functionality of network and systems management applications is presented to the user, comprising:

one or more approach controls; and one or more functionality controls through which the user can access functionality, wherein manipulation of an approach control of the one or more approach controls of the user interface selects a user interface approach of a plurality of user interface approaches of the user interface available to the user for presenting functionality to the user, wherein the plurality of user interface approaches from which the user interface approach is selected comprises two or more of the following user interface approaches: a task-based approach in which the user is assisted to complete one or more tasks, an object-based approach in which the user is assisted to manipulate objects, an information-based approach in which the user is presented with requested information, and a tools-based approach in which the user is provided with tools necessary to accomplish tool-based activities, and wherein upon selection of the user interface approach, the one or more functionality controls correspond to the selected user interface approach and functionality of the selected user interface approach can be accessed by selecting a functionality control of the one or more functionality controls.

2. The user interface of claim 1, wherein the one or more approach controls are a plurality of tabs.

3. The user interface of claim 1, wherein the one or more approach controls are presented to the user in a scoping pane of the user interface.

4. The user interface of claim 1, wherein the one or more approach controls are presented to the user in a menu.

5. The user interface of claim 1, wherein the one or more approach controls are presented to the user in a toolbar.

6. The user interface of claim 1, wherein the one or more functionality controls are presented to the user in a scoping pane of the user interface.

7. The user interface of claim 6, wherein the one or more functionality controls are contained in one or more folders of the scoping pane.

8. The user interface of claim 1, wherein the user interface approach is the object-based approach of the plurality of user interface approaches.

9. The user interface of claim 8, wherein the one or more functionality controls are one or more items of a list.

10. The user interface of claim 8, wherein the one or more functionality controls are one or more items of a menu.

11. The user interface of claim 1, wherein the user interface approach is the task-based approach of the plurality of user interface approaches.

12. The user interface of claim 11, wherein the one or more functionality controls are tasks.

13. The user interface of claim 1, wherein the user interface approach is the information-based approach of the plurality of user interface approaches.

14. The user interface of claim 13, wherein the one or more functionality controls are reports.

15. The user interface of claim 1, wherein the user interface approach is the tool-based approach of the plurality of user interface approaches.

16. The user interface of claim 15, wherein the one or more functionality controls are tools.

17. The user interface of claim 1, wherein the window is an application window.

18. The user interface of claim 17, wherein the user interface of the application window further comprises:

a scoping pane, wherein the selection of the functionality control causes the functionality of the user interface approach of the application window to be presented to the user in the content pane.

19. The user interface of claim 1, wherein the window is a launcher window.

20. The user interface of claim 1, wherein the user interface approach of the user interface is changed by subsequent manipulation of the one or more approach controls to select a new user interface approach of the plurality of user interface approaches.

21. The user interface of claim 20, wherein changing the user interface approach to select the new user interface approach changes the one or more functionality controls that are presented to the user to correspond to the new user interface approach.

22. A method for allowing a user to change the way in which functionality of network and systems management applications is presented to the user of a window of a windows-based computer environment for network and systems management applications, comprising:

choosing a user interface approach of a plurality of user interface approaches available for presenting functionality to the user in a user interface of the window, wherein the plurality of user interface approaches comprises two or more of the following user interface approaches: a task-based approach in which the user is assisted to complete one or more tasks, an object-based approach in which the user is assisted to manipulate objects, an information-based approach in which the user is presented with requested information, and a tools-based approach in which the user is provided with tools necessary to accomplish tool-based activities;

selecting the user interface approach of the user interface for presenting functionality to the user by manipulating an approach control of one or more approach controls of the user interface;

upon selecting the user interface approach, causing one or more functionality controls of the user interface through which the user can access functionality and which correspond to the selected user interface approach to be presented to the user in the user interface;

choosing a functionality control of the one or more functionality controls of the user interface approach; and accessing the functionality of the selected user interface approach by selecting the functionality control of the one or more functionality controls of the user interface approach.

23. The method of claim 22, wherein selecting the functionality control in order to access the functionality of the selected user interface approach is accomplished by locating a folder of one or more folders of a scoping pane of the user interface that contains the functionality control.

24. The method of claim 22, wherein selecting the functionality control of the user interface approach causes the functionality of the selected user interface approach to be presented to the user in the content pane of an application window.

25. The method of claim 22, further comprising:

choosing a new user interface approach of the plurality of user interface approaches that is different from the user interface approach; and selecting the new user interface approach by manipulating a new approach control of one or more approach controls that is different from the approach control previously selected and that corresponds to the new user interface approach.

26. The method of claim 25, wherein selecting the new user interface approach causes the one or more functionality controls that are presented to the user to change to correspond to the selected new user interface approach.

27. The method of claim 22, further comprising:

choosing a new functionality control of the one or more functionality controls corresponding to a new functionality of the user interface approach; and accessing the new functionality of the user interface approach by selecting the new functionality control of the user interface approach.

28. The method of claim 27, wherein accessing the new functionality is accomplished by locating a folder of one or more folders of a scoping pane of the user interface that contains the new functionality control.

29. The method of claim 27, wherein selecting the new functionality control of the user interface approach causes the new functionality of the selected new user interface approach to be presented to the user in the content pane of an application window.

30. A computer-readable medium having a computer program for allowing a user to change the way in which functionality of network and systems management applications is presented to the user of a window of a windows-based computer environment, comprising:

in response to the user manipulating an approach control of one or more approach controls that correspond to a plurality of user interface approaches in a user interface of the window, instructions for selecting a user interface approach of a plurality of user interface approaches of the user interface available for presenting functionality to the user in the user interface of the window that corresponds to the manipulated approach control, wherein the plurality of user interface approaches comprises two or more of the following user interface approaches: a task-based approach in which the user is assisted to complete one or more tasks, an object-based approach in which the user is assisted to manipulate objects, an information-based approach in which the user is presented with requested information, and a tools-based approach in which the user is provided with tools necessary to accomplish tool-based activities; and instructions for causing one or more functionality controls of the user interface through which the user can access functionality and which correspond to the selected user interface approach to be presented to the user in the user interface;

in response to the user selecting a functionality control of the one or more functionality controls that correspond to the selected user interface approach, instructions for accessing and displaying the functionality of the selected user interface approach corresponding to the selected functionality control.

31. The medium of claim 30, wherein the instructions for accessing the functionality of the selected user interface approach is accomplished by instructions for locating a folder of one or more folders of a scoping pane of the user interface that contains the functionality control.

32. The medium of claim 30, wherein the instructions for accessing and presenting the functionality of the selected user interface approach causes the functionality of the selected user interface approach to be presented to the user in the content pane of an application window.

33. The medium of claim 30, further comprising:

in response to the user manipulating a new approach control of the one or more approach controls that is different from the approach control previously selected, instructions for selecting a new user interface approach of the plurality of user interface approaches that is different from the user interface approach and corresponds to the new approach control manipulated by the user.

34. The medium of claim 33, wherein the instructions for selecting the new user interface approach causes the one or more functionality controls that are presented to the user to change to correspond to the selected new user interface approach.

35. The medium of claim 30, further comprising:

in response to the user selecting a new functionality control of the one or more functionality controls corresponding to a new functionality of the user interface approach, instructions for accessing and displaying the new functionality of the user interface approach to the user in the user interface.

36. The medium of claim 35, wherein the instructions for accessing and displaying the new functionality are accomplished by locating a folder of one or more folders of a scoping pane of the user interface that contains the new functionality control.

37. The medium of claim 35, wherein the instructions for accessing and displaying the new functionality of the user interface approach causes the new functionality to be presented to the user in the content pane of an application window.

* * * * *